Aug. 27, 1957   J. J. ZEEGERS   2,804,193
FACE CONVEYOR
Filed June 29, 1954                    3 Sheets-Sheet 1
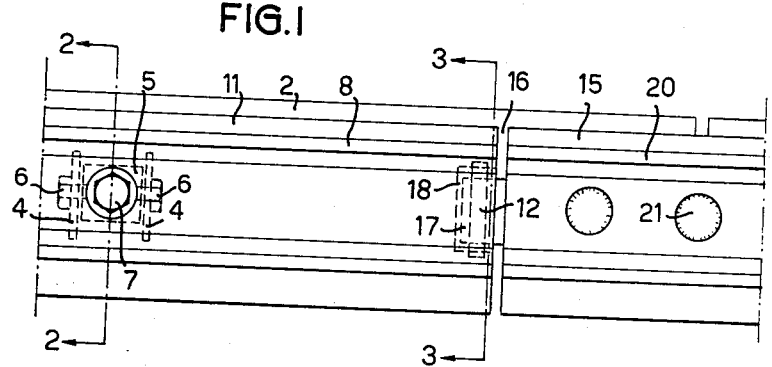
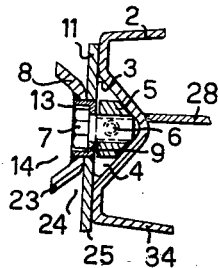
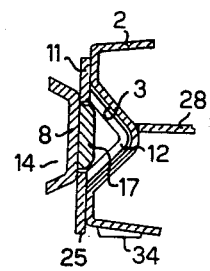
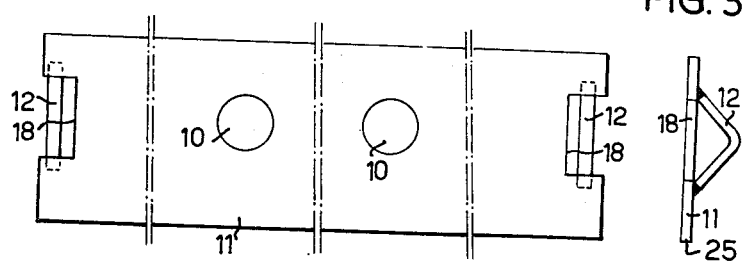
Inventor
Jan J. Zeegers
By Cushman, Darby & Cushman
Attorneys

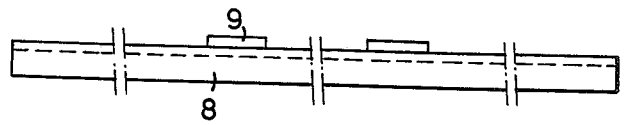
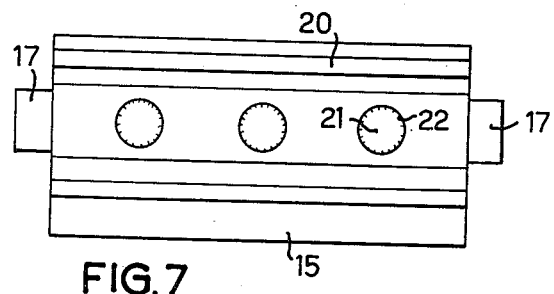
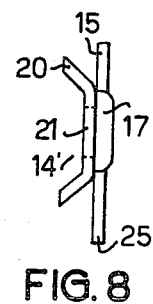
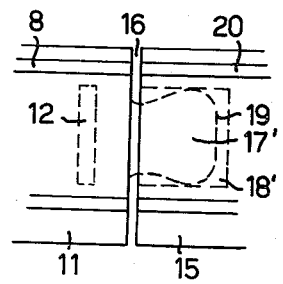
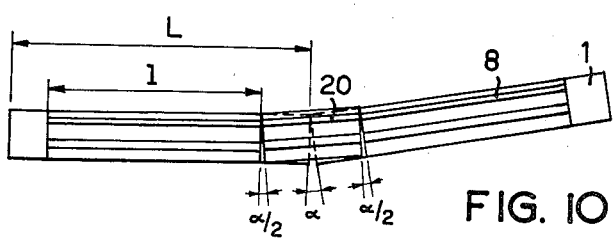

Aug. 27, 1957  J. J. ZEEGERS  2,804,193
FACE CONVEYOR

Filed June 29, 1954  3 Sheets-Sheet 3

Inventor
Jan J. Zeegers
By Cushman, Darby & Cushman
Attorneys

United States Patent Office 2,804,193
Patented Aug. 27, 1957

2,804,193

FACE CONVEYOR

Jan J. Zeegers, Heerlen, Netherlands, assignor to Stamicarbon N. V., Heerlen, Netherlands Application June 29, 1954, Serial No. 440,165

Claims priority, application Netherlands July 2, 1953

10 Claims. (Cl. 198—204)

The invention relates to conveyors and more particularly to a mining face conveyor of the type having a stationary trough formed by a plurality of sections which are capable of a certain articulation with respect to each other, and a guide rail likewise formed by relatively articulating sections upon which a reciprocable mining machine is adapted to operate.

In such conveyors, the connection of the trough sections so that they can articulate relative to each other enables the conveyor to follow variations in the level of the floor of the seam caused by upfolds, downfolds, faults or the like and also enables the trough to be advanced section by section without disconnecting the sections as the face cutting advances. The actual conveying means, for example, a chain with scrapers attached thereto, moving in the trough, can follow these angular deviations without difficulty.

However, when the conveyor sections are angled with respect to each other, difficulties may arise in connection with the reciprocation of the mining machine because at the points where the adjacent guide rail sections are not in true alignment the machine may abut the ends of the rail sections with a resulting damage to the guide rail. Moreover, the travel of the mining machine may be arrested. This danger is increased in accordance with the extent to which the adjacent guide rail sections are angled out of alignment.

It is an object of the present invention to provide a face conveyor of the type described, whereby interference with the movement of the mining machine because of angular deviations in the guide rail sections is materially reduced or substantially eliminated.

Another object of the invention is to provide a face conveyor in which the angle between the guide rail sections for the coal mining machine is smaller than the angle between the sections of the conveyor trough.

Another object of the invention is to provide a face conveyor in which the angle between the guide rail sections is only about one-half the angular deviation between the trough sections.

Another object of the invention is to provide a face conveyor in which wear of the side walls due to the movement of the coal mining machine therealong is eliminated.

Still another object of the invention is to provide a face conveyor which may be economically produced and readily assembled.

Still another object of the invention is to provide a face conveyor wherein the coal mining machine is guided along hardened surfaces.

A further object of the invention is to provide a face conveyor in which the shape of the guide elements of the coal mining machine are independent of the profile of the side walls of the conveyor trough.

A further object of the invention is to provide a face conveyor wherein the tendency of the coal mining machine to climb in the coal as it is guided along the conveyor is materially reduced.

These and other objects of the present invention will become more apparent during the course of the following detailed description and appended claims.

The invention may best be understood with reference to the accompanying drawings wherein an illustrative embodiment is shown.

In the drawings:

Figure 1 is a partial side elevational view of one side wall of a face conveyor at the junction of two conveyor guide rail sections;

Figure 2 is a cross-sectional view taken along the line 2—2 of Figure 1;

Figure 3 is a cross-sectional view taken along the line 3—3 of Figure 1;

Figure 4 is a front elevational view of a guide plate section;

Figure 5 is an end view of the plate shown in Figure 4;

Figure 6 is a plan view of a guide rail section;

Figure 7 is a front elevational view of a short guide plate section with a guide rail section attached thereto;

Figure 8 is an end view of the structure shown in Figure 7;

Figure 9 is a partial front elevational view of connected long and short plate sections of modified construction;

Figure 10 is a diagrammatic side elevational view showing joined sections of the conveyor angled in the vertical plane;

Figure 11:
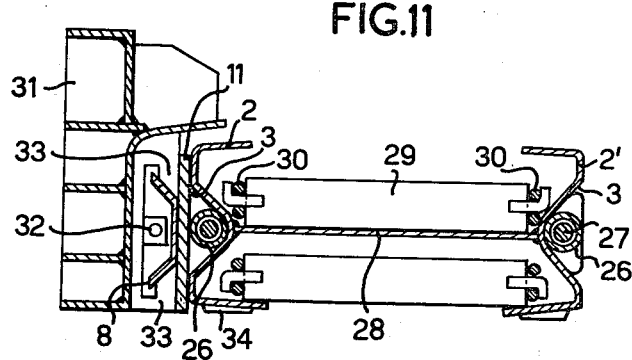
Figure 11 is a cross sectional view of the conveyor with a coal mining machine mounted thereon.
Figure 12:
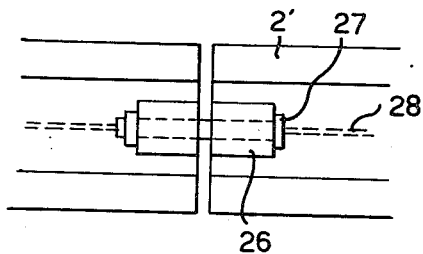
Figure 12 is a front elevational view showing the connection of two trough sections.

Referring now more particularly to the drawings, the trough of the face conveyor is composed of a plurality of trough sections 1 adapted to be interconnected so as to permit slight relative articulation in both a horizontal plane and a vertical plane. Each of the trough sections 1 preferably includes a pair of parallel side walls 2 and 2' connected by a horizontal plate 28 which serves as a transporting surface for coal or other material loaded in the trough. The side walls 2 and 2' are preferably pressed from iron sheets and suitably secured at their inner midportions to opposite sides of the plate 28, as by welding or the like. As shown in Figures 11 and 12, the side walls are preferably W-shaped in cross section so that the outer midportion of each side wall provides a longitudinal channel 3 for receiving sleeves 26 which are preferably secured therein, as by welding or the like, at the opposite ends of each side wall. A suitable fastening element, such as bolt 27, is extended between adjacent sleeves in order to connect the trough sections together. It is to be noted that bolts 27 are loosely received within the sleeves 26 so as to provide ample clearance to permit articulation of the sections with respect to each other. Mounted for operation within the trough sections are suitable scraper blades 29 connected in spaced relation by a pair of endless chains 30. It is to be understood that the blades 29 and chains 30 are mounted so as to readily follow any angular deviations caused by articulation between the trough sections.

As best shown in Figure 10, a short guide rail section 20 is disposed adjacent the juncture of the trough sections 1 along the outer side wall 2 and a long guide rail section 8 extends between each short section 20. Rail sections 8 and 20 are adapted to guide a mining machine, as for example, coal plow 31 (Figure 11) along the conveyor.

The guide rail sections 8 are secured to the side wall 2 of the trough sections by any suitable means, one example of which is shown in detail in Figure 2. As shown, a plurality of plate members 4, arranged in pairs, are secured within the longitudinal channel 3 in the side wall 2. Suitably secured, as by bolts 6, between each pair of plate members 4 is a block 5 having a central threaded aperture for receiving a guide rail section securing bolt 7.

Disposed in abutting relation between each side wall 2 and guide rail section 8 is a guide plate section 11 provided with suitable apertures 10 for receiving one end of a plurality of corresponding cylindrical bosses 9 carried by the guide rail section 8. When the guide rail sections are being secured in position the guide plate sections 11 are clamped against the trough wall in proper location as determined by the bosses 9. As shown in Figure 2, each boss 9 may take the form of a hollow stud having a recess 13 provided in one end thereof. The recessed end of each boss is preferably secured, as by welding or the like, within a suitable aperture in the guide rail section 8 with its outer edge flush with the outer surface of the guide rail section. In this manner, the head of securing bolt 7 will seat within the recess 13 so that the outer surface of the guide rail section is free from any interfering projections. Thus, outwardly diverging inclined edge walls 23 of the sections 8 form an unobstructed channel 14 which may serve as a guideway for a hauling means 32 for the mining machine 31.

The length 1 of the guide plate sections 11 and the guide rail sections 8 is less than the length L of the trough sections 1 as shown in Figure 10. At the region where two trough sections are joined, a short guide plate section 15 is mounted so as to bridge the trough section junction. Each said short guide plate section is disposed so that a small gap 16 is left between each end thereof and the end of the adjacent longer plate section 11. The short guide plate sections are not fixed to the trough, but have projecting tongue portions 17, at their ends, which portions are received in recesses 18 in the ends of the long plate sections 11. A relatively small clearance is allowed between the tongues and recesses so that the long and short plate sections are capable of a slight relative articulation in the vertical plane.

To make it possible for the plates 11 to be properly centered on the trough sections, braces 12 are mounted on the backs of the guide plate sections and fit in the channel 3 in the side wall 2. The braces 12 are disposed so as to bridge over the recesses 18 in the plate sections 11, and the tongue portions 17 in entering the recesses 18, pass between the said braces and the guide rail sections 8, so that the plate sections 15 are thereby retained in position by means independent of the side wall 2. The tongue portions have some lateral clearance between the braces 12 and the guide rail sections 8 and the recesses 18 are longer than the intruding parts of the tongue portions, so so that the short plate sections are also capable of articulating in the horizontal plane relative to the longer plate sections 11.

In the modified embodiment shown in Figure 9, a tongue 17' is provided on the plate section 11 which includes a rounded end portion 19 adapted to pass into a recess 18' in the shorter plate section 15. With this construction, there is no need for clearance between the tongue and the upper and lower edges of the recess.

To each short guide plate section 15 there is secured a guide rail section 20, which is of the same length as the plate section 15. In each said short guide rail section 20 a number of holes 21 are provided and the connection with the appertaining plate section is preferably made by deposition of welds 22 around the edges of the holes 21. In this way channels 14', formed by the guide rail sections 20 are kept clear for the passage of the hauling means 32 for mining machine 31.

The plate sections 11 and 15 are of substantially equal width and thickness and disposed so that between the inclined walls 23 of the guide rail and the guide plate, grooves 24 are formed which may serve as guide grooves for cooperating guiding means 33 of the mining machine. The plates are preferably hardened in order to render them properly wear-resistant.

The lower edges 25 of the plate sections 11 and 15 are at approximately the same level or slightly lower than the corresponding edge 34 of the conveyor trough wall, so that the side of the conveyor nearest to the coal face is supported on these plates. When the conveyor is advanced, loose coal or other material lying on the floor is pushed ahead, so that the mining machine does not tend to climb upwards through the seam and no loose coal or other material remains behind on the floor.

If the floor under the conveyor is not level, the consecutive trough sections 1 will not be in alignment but their adjacent ends will make an angle of $\alpha$ in the vertical plane (see Figure 10). However, under these conditions the angle between the adjacent ends of neighboring guide rail sections 8 and 20 will be only $\frac{1}{2}\alpha$, because the total deviation is divided between the two junctions at the ends of the short guide rail section 20. As a result the mining machine is better guided than in the case where the angle formed between the adjacent ends of the guide rail sections is equal to that formed between the corresponding ends of the trough sections.

It can thus be seen that the conveyor of the present invention provides between each guide rail section and the adjacent wall of the appertaining trough section, a section of a guide plate adapted to provide a vertical guide face for a mining machine which reciprocates along the guide rail. The angle formed between adjacent sections of guide rail when the conveyor sections articulate is reduced by the termination of the plate and guide rail sections short of the ends of the appertaining conveyor sections and the provision of a separate short plate and connected guide rail sections which, bridging over the ends of adjacent conveyor sections, extend between the ends of the longer guide rail and plate sections and are held in place so that the adjoining conveyor sections may articulate in vertical and horizontal planes relative thereto.

Preferably, the guide plate sections make tongue and recess engagement in such manner as to allow the desired relative articulation of the said sections and the guide rail sections connected thereto.

With this construction, when the adjacent trough sections articulate, for example, in the vertical plane, the angular deviation between each guide rail section fixed to one of the trough sections, and the shorter joining section of guide rail, is only half the angular deviation between the said trough sections.

With conveyors of well known construction the mining machine is guided in contact with the side wall of the trough, and in order to prevent the side wall from wearing too rapidly, it is usual to harden the surface of the side wall. Moreover, where the trough is symmetrical in transverse cross-section so that either side wall may serve as the guide face, both side walls of the trough are in practice hardened, and this involves a material increase of the manufacturing cost. With the conveyor of the present invention, however, the plate is provided between the mining machine and the trough wall so that the side walls of the trough need not be hardened; it suffices merely to harden the plate. The use of a plate as a guide face for the mining machine is further advantageous in that the shape of the cooperating guide-engaging means of the mining machine may be independent of the profile of the trough wall.

During the cutting of a mine face the conveyor is shifted towards the face and with the conventional structure the side wall of the conveyor nearest to the coal face tends to ride over the slack coal or other material left behind on the floor of the seam, as a result of which the side wall is lifted slightly. Consequently, unless countermeasures are taken, the mining machine tends to cut into the face at a slightly higher level at each stroke. With the present invention this tendency of the mining machine to climb upwards through the seam is substantially prevented by forming the guide plate sections with their lower edges on approximately the same level as the lower edge of the appertaining side wall of the conveyor. Thus, when the conveyor is advanced, the coal lying on the floor in front of the conveyor is pushed forwards by the plate for subsequent lifting into the conveyor by the loading elements of the mining machine.

It is to be understood, however, that the form of the invention herewith shown and described is to be taken as the preferred embodiment of the same and that various changes may be made without departing from the spirit of the invention or the scope of the appended claims.

I claim:

1. A face conveyor comprising a plurality of trough sections adapted to be connected end to end for relative articulation, each of said trough sections having a side wall, a plurality of guide rail sections carried by said side walls for guiding a reciprocating mining machine thereon, a plurality of guide plate sections between said guide rail sections and said side walls adapted to provide a vertical guide face for said mining machine, certain of said guide rail and guide plate sections being disposed between the ends of the appertaining side wall, the other of said guide rail and guide plate sections extending between the ends of said certain guide rail and guide plate sections and bridging over the ends of adjacent side walls whereby the angle formed between adjacent guide rail sections will be less than the angle formed between adjacent trough sections when the latter are not in alignment due to relative articulation therebetween.

2. A face conveyor of the character described in claim 1, wherein the ends of adjacent guide plate sections are spaced apart and joined for relative articulation by a tongue and recess connection.

3. A face conveyor of the character described in claim 2, wherein said tongue and recess connection includes a tongue loosely fitted within the recess.

4. A face conveyor of the character described in claim 2, wherein said tongue and recess connection includes a tongue having rounded end portions engaged within the recess.

5. A face conveyor of the character described in claim 1, wherein each of said guide plate sections disposed between the ends of the appertaining side wall includes braces extending toward said wall and wherein each of said side walls includes a longitudinal channel for receiving said braces.

6. A face conveyor of the character described in claim 5 wherein said braces are disposed on the ends of each of said guide plate sections, said ends being provided with recesses, the end of the adjacent guide plate section having a tongue extending therefrom adapted to be disposed in the adjacent recess between said brace and the end of the appertaining guide rail section.

7. A face conveyor of the character described in claim 1 wherein said guide plate sections disposed between the ends of the appertaining side wall are provided with openings and wherein the appertaining guide rail sections include projecting portions engaging in said guide plate section openings.

8. A face conveyor of the character described in claim 7 wherein said projecting portions are provided by hollow studs passing through said appertaining guide rail sections, each of said hollow studs being recessed for receiving the head of a bolt for securing the guide rail and guide plate sections to the appertaining side wall.

9. A face conveyor of the character described in claim 1 wherein each of said other of said guide rail sections are connected to the appertaining guide plate section by welding.

10. A face conveyor comprising a plurality of trough sections adapted to be connected end to end for relative articulation, each of said trough sections having a side wall, a long guide section carried by each side wall between the ends thereof, a short guide section extending between the ends of said long guide sections and bridging over the ends of adjacent side walls whereby the angle formed between adjacent guide sections will be less than the angle formed by adjacent trough sections when the latter are not in alignment due to relative articulation therebetween, said guide sections being adapted to smoothly guide a reciprocating mining machine therealong and providing a vertical guide face for said machine.

References Cited in the file of this patent

FOREIGN PATENTS

| 645,724 | Germany | June 3, 1937 |
| 986,337 | France | Mar. 21, 1951 |
| 843,678 | Germany | July 10, 1952 |
| 696,415 | Great Britain | Sept. 2, 1953 |